US012680855B2

(12) United States Patent　　　　(10) Patent No.:　US 12,680,855 B2
Arras et al.　　　　　　　　　　　　 (45) Date of Patent:　　Jul. 14, 2026

(54) METHOD AND DEVICE FOR DETERMINING THE FUEL VOLUME IN A FUEL CONTAINER

(71) Applicant: Bayerische Motoren Werke Aktiengesellschaft, Munich (DE)

(72) Inventors: Emmanuel Arras, Munich (DE); Michael Buhl, Grafing (DE); Attila Farkas, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 254 days.

(21) Appl. No.: 18/287,585

(22) PCT Filed: Apr. 20, 2022

(86) PCT No.: PCT/EP2022/060325
§ 371 (c)(1),
(2) Date: Oct. 19, 2023

(87) PCT Pub. No.: WO2022/223564
PCT Pub. Date: Oct. 27, 2022

(65) Prior Publication Data
US 2024/0210231 A1　　Jun. 27, 2024

(30) Foreign Application Priority Data

Apr. 22, 2021　(DE) .................... 10 2021 110 174.3

(51) Int. Cl.
G01F 23/14　　　(2006.01)
G01F 23/22　　　(2006.01)
G01F 23/80　　　(2022.01)

(52) U.S. Cl.
CPC .............. G01F 23/14 (2013.01); G01F 23/22 (2013.01); G01F 23/80 (2022.01)

(58) Field of Classification Search
CPC .......... G01F 23/14; G01F 23/22; G01F 23/80; G01F 23/00; B60K 15/03; B60K 2015/03217
(Continued)

(56) References Cited

U.S. PATENT DOCUMENTS 4,485,794 A * 12/1984 Kimberley .......... F02D 41/1466
123/681
7,865,317 B2 * 1/2011 Begin ................... G01F 23/804
702/50
(Continued)

FOREIGN PATENT DOCUMENTS

JP　　2004-317254 A　　11/2004
JP　　2019-39510 A　　3/2019
(Continued)

OTHER PUBLICATIONS

Underhood Service Servicing Saddle-Style Fuel Tanks (Year: 2016).*
(Continued)

*Primary Examiner* — Kristina M Deherrera
(74) *Attorney, Agent, or Firm* — Crowell & Moring LLP

(57)　　　　ABSTRACT

A device for determining a value of fuel volume in a fuel container for a current point in time is configured to determine an estimated value of the fuel volume for the current point in time based on a previous value of the fuel volume for a previous point in time and based on extraction data relating to fuel extraction from the fuel container, determine a minimum value and/or a maximum value of the fuel volume for the current point in time based on a measurement value from a fill level sensor of the fuel container for the current point in time, and determine the value of the fuel volume for the current point in time based on the estimated
(Continued)

value of the fuel volume and based on the minimum value and/or the maximum value of the fuel volume for the current point in time.

18 Claims, 2 Drawing Sheets

(58) Field of Classification Search
USPC .......................................................... 73/861
See application file for complete search history.

(56) References Cited

U.S. PATENT DOCUMENTS

| | | | |
|---|---|---|---|
| 9,758,097 | B2 | 9/2017 | Yanatsubo et al. |
| 9,850,845 | B2 * | 12/2017 | Sloan ...................... G01F 23/18 |
| 2010/0145638 | A1 | 6/2010 | Begin |
| 2011/0010070 | A1 | 1/2011 | Bohr et al. |
| 2016/0258377 | A1 | 9/2016 | Wang |

FOREIGN PATENT DOCUMENTS

| | | |
|---|---|---|
| JP | 2020-105926 A | 7/2020 |
| WO | WO 2020/030635 A1 | 2/2020 |

OTHER PUBLICATIONS

International Search Report (PCT/ISA/210) issued in PCT Application No. PCT/EP2022/060325 dated Aug. 2, 2022 with English translation (5 pages).
German-language Written Opinion (PCT/ISA/237) issued in PCT Application No. PCT/EP2022/060325 dated Aug. 2, 2022 with English translation (9 pages).
German Search Report issued in German Application No. 10 2021 110 174.3 dated Feb. 18, 2022 with partial English translation (11 pages).

* cited by examiner

300 determining a fill level estimated value on the basis
of the fuel removal

301 determining a value interval on the basis of a measured
value of the fill level

302 determining a value of the fill level on the basis of the
fill level estimated value and on the basis of the value interval

303

METHOD AND DEVICE FOR DETERMINING THE FUEL VOLUME IN A FUEL CONTAINER

BACKGROUND AND SUMMARY

The technology disclosed here relates to a method and a corresponding device for determining the fill level of a fuel container and/or the fuel volume in a fuel container.

A vehicle typically includes a fuel container, in which fuel for the operation of a drive engine, in particular an internal combustion engine of the vehicle is stored. The fuel container can be filled with fuel at a filling station. The vehicle typically comprises a fill level indicator, via which the current fill level of the fuel container is displayed to the user of the vehicle. The value of the fill level displayed via the fill level indicator can be corrupted here by different influences, for example, by the temperature of the fuel container, by the pressure inside the fuel container, and/or by the inclination of the fuel container, which can result in impairments of the comfort for the user of the vehicle.

It is a preferred object of the technology disclosed here to reduce or remedy at least one disadvantage of a previously known solution or to propose an alternative solution. It is in particular a preferred object of the technology disclosed here to determine the value of the fill level of a fuel container, in particular of a vehicle, in an efficient and precise manner, in particular to provide a precise fill level indicator in a vehicle.

The object(s) is/are achieved by the subject matter of the present disclosure, which also discloses the preferred embodiments.

According to one aspect, a device for determining the value of the fuel volume in a fuel container for a current point in time (k) is described. The fuel container can be designed to store a liquid fuel, in particular gasoline or diesel. Furthermore, the fuel container can be designed to be filled with fuel at a filling station. The fuel container can be designed to provide fuel for the operation of an energy converter, in particular an internal combustion engine. The value of the fuel volume in the fuel container is also designated in this document as the fill level value of the fuel container. The value of the fuel volume can indicate in particular which volume (for example how many liters) of fuel is located in the fuel container.

The device is configured to determine an estimated value of the fuel volume for the current point in time on the basis of a preceding value of the fuel volume for a preceding point in time (in particular for a directly preceding point in time, such as k−1) and on the basis of removal data with respect to the fuel removal from the fuel container. The removal data can indicate the fuel amount or the fuel volume which was removed from the fuel container between the preceding point in time and the current point in time. The removal data can be determined on the basis of at least one volume flow sensor.

As already described above, the fuel can be removed from the fuel container to operate an energy converter, in particular an internal combustion engine. The device can be configured to determine the removal data with respect to the fuel removal on the basis of the consumption amount of fuel which is or was consumed by the energy converter between the preceding point in time and the current point in time.

The estimated value $V\_p(k)$ can be determined in particular as $V\_p(k)=V(k-1)-\text{deltaV}(k)$, wherein $V(k-1)$ is the preceding value of the fuel volume for the preceding point in time and wherein $\text{deltaV}(k)$ is the fuel amount which was removed from the fuel container between the preceding point in time and the current point in time.

The device can furthermore be configured to determine a minimum value and/or a maximum value of the fuel volume for the current point in time on the basis of a measured value of a fill level sensor (such as a lever sensor) of the fuel container for the current point in time. The measurement inaccuracy of the fill level sensor at the current point in time can be taken into consideration here for the determination of the minimum value and/or the maximum value. It can thus be determined how strongly (due to the currently existing measurement uncertainty) the actual value of the fuel volume can deviate from the measured value of the fill level sensor. The measurement inaccuracy can be dependent here on one or more systematic and/or long-term error sources, for example, on the thermal and/or pressure-related deformation of the fuel container, the inclination of the pressurized container, and/or the geometry of the fuel container (and on a fuel inclusion thus caused in one or more subregions of the fuel container).

Furthermore, the device can be configured to determine the value of the fuel volume for the current point in time on the basis of the estimated value of the fuel volume and on the basis of the minimum value and/or the maximum value of the fuel volume for the current point in time. In particular, the device can be configured to adjust or leave unchanged the estimated value of the fuel volume for the current point in time on the basis of the minimum value and/or the maximum value of the fuel volume for the current point in time, in particular as a function of a deviation of the maximum value from the minimum value, in order to determine the value of the fuel volume for the current point in time. The adjustment of the estimated value can take place here as a function of the minimum value and/or the maximum value.

The device can be configured in particular to determine the value of the fuel volume in a recursive manner solely on the basis of the removal data, if the measured values of the fill level sensor have a relatively large measurement uncertainty (and thus a relatively large value interval of possible values of the fuel volume is spanned by the minimum value and the maximum value). On the other hand, the value of the fuel volume can be determined in consideration of the measured values of the fill level sensor if the measured values of the fill level sensor have a relatively small measurement uncertainty (and thus a relatively small value interval of possible values of the fuel volume is spanned by the minimum value and the maximum value). Precise values of the fuel volume can thus be determined in an efficient and robust manner (independently of the measurement accuracy of the fill level sensor).

The device can be configured to determine whether the estimated value of the fuel volume for the current point in time falls in the value interval for the fuel volume defined (in particular delimited) by the minimum value and the maximum value. This tends to be the case if the value interval is relatively large (and therefore the measurement uncertainty of the fill level sensor is relatively large). The estimated value of the fuel volume for the current point in time can be accepted (unchanged) as the value of the fuel volume for the current point in time if it is determined that the estimated value of the fuel volume for the current point in time falls in the value interval for the fuel volume. The value of the fuel volume can then be determined in a precise manner solely on the basis of the removal data.

Alternatively or additionally, the device can be configured to determine that the estimated value of the fuel volume for the current point in time is less than the minimum value of the fuel volume for the current point in time. This tends to be the case if the value interval is relatively small (and thus the measurement uncertainty of the fill level sensor is relatively small). In this case, the estimated value of the fuel volume for the current point in time can be increased as a function of the minimum value of the fuel volume for the current point in time in order to determine the value of the fuel volume for the current point in time in a precise manner. For example, the value of the fuel volume for the current point in time can be determined as a weighted mean value of the estimated value of the fuel volume for the current point in time and the minimum value of the fuel volume for the current point in time.

Alternatively or additionally, the device can be configured to determine that the estimated value of the fuel volume for the current point in time is greater than the maximum value of the fuel volume for the current point in time. This tends to be the case if the value interval is relatively small (and thus the measurement uncertainty of the fill level sensor is relatively small). In this case, the estimated value of the fuel volume for the current point in time can be reduced as a function of the maximum value of the fuel volume for the current point in time in order to determine the value of the fuel volume for the current point in time. For example, the value of the fuel volume for the current point in time can be determined as the weighted mean value of the estimated value of the fuel volume for the current point in time and the maximum value of the fuel volume for the current point in time.

In particular, the device can be configured to determine the value $V(k)$ of the fuel volume for the current point in time k according to $V(k)=alpha*V\_p(k)+(1-alpha)*V\_min$ (if $V\_p(k)<V\_min$), wherein $V\_P(k)$ is the estimated value of the fuel volume for the current point in time k, and wherein $V\_min$ is the minimum value of the fuel volume for the current point in time k. Alpha is an adjustment factor (between 0 and 1). In a corresponding manner, the device can be configured to determine the value $V(k)$ of the fuel volume for the current point in time k according to $V(k) =alpha*V\_p(k)+(1-alpha)*V\_max$ (if $V\_p(k)>V\_max$), wherein $V\_max$ is the maximum value of the fuel volume for the current point in time k.

In the case of a relatively small measurement uncertainty, the measured value of the fill level sensor can thus be used for the precise determination of the value of the fuel volume.

The device can be configured to determine an estimated value of the fuel volume for the respective point in time (in particular on the basis of the abovementioned formula) iteratively, for a sequence of successive points in time, each on the basis of the respective preceding value of the fuel volume for the respective preceding point in time and on the basis of respective current removal data with respect to the fuel removal from the fuel container. Furthermore, a minimum value and/or a maximum value of the fuel volume for the respective point in time can be determined on the basis of a measured value of the fill level sensor of the fuel container for the respective point in time. In addition, the value of the fuel volume for the respective point in time can be determined on the basis of the estimated value of the fuel volume and on the basis of the minimum value and/or the maximum value of the fuel volume for the respective point in time. An updated value of the fuel volume can thus be determined iteratively and/or repeatedly at a specific sampling rate (for example of 1 Hz or more) in an efficient and precise manner.

The device can be configured to determine pressure data with respect to the internal pressure of the fuel container for the current point in time on the basis of a pressure sensor. The minimum value and/or the maximum value of the fuel volume for the current point in time can then be determined in a precise manner on the basis of the pressure data. (Experimentally determined) characteristic data can be taken into consideration here, which indicate the volume change and/or deformation of the fuel container as a function of the internal pressure of the fuel container.

Alternatively or additionally, the device can be configured, for the current point in time, to determine temperature data with respect to the temperature of the fuel container and/or with respect to the temperature of fuel in the fuel container on the basis of a temperature sensor. The minimum value and/or the maximum value of the fuel volume for the current point in time can then be determined in a precise manner on the basis of the temperature data. (Experimentally determined) characteristic data can be taken into consideration here, which indicate the volume change and/or deformation of the fuel container as a function of the temperature of the fuel container and/or the fuel.

Alternatively or additionally, the device can be configured, for the current point in time, to determine inclination data with respect to the inclination of the fuel container on the basis of a sensor (for example, on the basis of an inertial measurement unit and/or on the basis of an acceleration sensor). The minimum value and/or the maximum value of the fuel volume for the current point in time can then be determined in a precise manner on the basis of the inclination data. (Experimentally determined) characteristic data can be taken into consideration here, which indicate the deviation of the value of the fuel volume from the measured value of the fill level sensor as a function of the inclination of the fuel container. An inclination around one, two, or three different axes (perpendicular to one another) can be taken into consideration here.

As already described above, the fuel container can be designed such that the fuel container includes at least one subregion, in which fuel can be arranged depending on the fill level of the fuel container, without the fuel being detected by the fill level sensor. This can be the case, for example, with a saddle tank.

The device can be configured to estimate a fuel amount, which could be arranged in the subregion of the fuel container without being detected by the fill level sensor, on the basis of the measured value of the fill level sensor of the fuel container for the current point in time and on the basis of characteristic data with respect to the fuel container. The (experimentally determined) characteristic data for different measured values of the fill level sensor can each indicate an estimated fuel amount here, which could be arranged in the subregion of the fuel container without being detected by the fill level sensor at the fill level of the fuel container indicated by the respective measured value. The maximum value of the fuel volume for the current point in time can then be determined in a particularly precise manner on the basis of the estimated (enclosed) fuel amount.

According to a further aspect, a fuel container system having a fuel container is described, which comprises the device described in this document.

According to a further aspect, a (road) motor vehicle (in particular a passenger vehicle or a truck or a bus or a motorcycle) is described, which comprises the device described in this document and/or the fuel container system described in this document.

According to a further aspect, a method for determining a value of a fuel volume in a fuel container for a or at a current point in time is described. The method comprises determining an estimated value of the fuel volume for the or at the current point in time on the basis of a preceding value of the fuel volume for a or at a preceding point in time and on the basis of removal data with respect to a fuel removal from the fuel container. Furthermore, the method comprises determining a minimum value and/or a maximum value of the fuel volume for the or at the current point in time on the basis of a measured value of a fill level sensor of the fuel container for the or at the current point in time. In addition, the method comprises determining the value of the fuel volume for the or at the current point in time on the basis of the estimated value of the fuel volume and on the basis of the minimum value and/or the maximum value of the fuel volume for the or at the current point in time.

According to a further aspect, a software (SW) program is described. The SW program can be configured to be executed on a processor (for example on a control unit of a vehicle), and to thus carry out the method described in this document.

According to a further aspect, a storage medium is described. The storage medium can comprise an SW program, which is configured to be executed on a processor, and to thus carry out the method described in this document.

It is to be noted that the methods, devices, and systems described in this document can be used both alone and in combination with other methods, devices, and systems described in this document. Furthermore, any aspects of the methods, devices, and systems described in this document can be combined with one another in a variety of ways. In particular, the features of the claims can be combined with one another in a variety of ways.

The invention will be described in more detail hereinafter on the basis of exemplary embodiments.

DETAILED DESCRIPTION OF THE DRAWINGS

Figure 1:
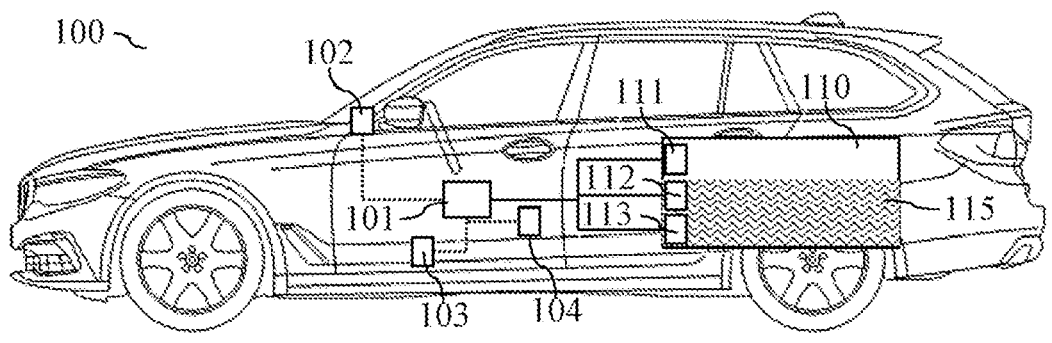
FIG. 1 shows an exemplary vehicle having a fuel container.

As described at the outset, the present document relates to efficiently and precisely determining the fill level value of a fuel container (i.e., the value of the fuel volume in a fuel container). In this context, FIG. 1 shows an exemplary vehicle 100 having a fuel container 110 for accommodating (liquid) fuel 115. The vehicle 100 comprises an output element 102, for example, on a display screen of the vehicle 100, for displaying the fill level of the fuel container 110.

The measured value of a fill level sensor 113, for example, a lever sensor, of the fuel container 110 can be used to determine the fill level value, which is output via the output element 102. In particular, a corresponding sequence of measured values of the fill level sensor 113 can be determined at a sequence of points in time. The sequence of measured values can be (low-pass) filtered to remove chronological variations, in particular measurement noise, from the measured values. The fill level value for output via the output element 102 can then be determined on the basis of the filtered measured values. In particular, the filtered measured values can be output via the output element 102.

Short-term measurement uncertainties and/or short-term effects, such as wave movements of the fuel 115 in the fuel container 110, can be reduced by the chronological filtering of measured values of the fill level sensor [103] 113. On the other hand, systematic and/or longer-term errors cannot be taken into consideration and/or compensated for in the determination of the fill level value on the basis of the fill level sensor [103] 113. Exemplary systematic and/or longer-term errors are, a change of the capacity of the fuel container 110 due to the internal pressure (overpressure or underpressure) in the fuel container 110 and/or due to the temperature of the fuel container 110;

an inclination of the fuel container 110 (for example, during an uphill or downhill journey of the vehicle 100); and/or an enclosure of fuel 115 in a subregion of the fuel container 110 (for example, in the case of a saddle tank).

An (evaluation) device 101 (of the vehicle 100) can be configured to take into consideration systematic and/or longer-term errors in the determination of the fill level value of the fuel container 110. In particular, the temperature data of a temperature sensor 112 of the fuel container 110 and/or the pressure data of a pressure sensor 111 of the fuel container 110 can be taken into consideration in the determination of the fill level value of the fuel container 110. Alternatively or additionally the sensor data of an inclination sensor 103, in particular an inertial measurement unit, can be taken into consideration in the determination of the fill level value of the fuel container 110. Characteristic maps determined beforehand can be taken into consideration here, which indicate a corrected fill level value of the fuel container 110 for a (possibly filtered) measured value of the fill level sensor 113 as a function of a temperature value, a pressure value, and/or an inclination value. However, providing such characteristic maps is linked to a relatively high development expenditure.

Figure 2A:
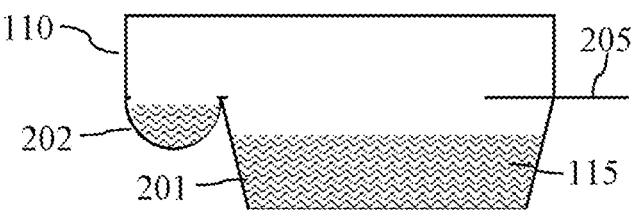
FIG. 2A shows an exemplary fuel container having multiple subregions.

FIG. 2A shows an exemplary fuel container 110 having multiple subregions 201, 202, which result, for example, from the goal of integrating the fuel container 110 in a manner efficient in installation space in a vehicle 100. The fill level sensor 113 can be arranged, for example, in a first subregion 201. This can have the result that fuel 115, which is at least temporarily enclosed in the second subregion 202 of the fuel container 110, is not taken into consideration in the measured value of the fill level sensor 113, so that an excessively low fill level value results. Such an effect can result in particular if the fill level value is less than a specific fill level threshold value 205 (from which the fuel column in the first subregion 201 and the fuel column in the second subregion 202 are no longer connected to one another). Such an enclosure of fuel 115 in one subsection 202 of the fuel container 110 typically cannot be readily taken into consideration in the determination of the fill level value of the fuel container 110. In particular, swapping fuel 115 out of or swapping fuel 115 into an isolated subregion 202 of the fuel container 110 can result in significant changes of the determined fill level value and/or significant deviation from the measured value of the fill level sensor 113.

Starting from a fill level value (also designated as a volume value in this document) V(k−1) for the preceding point in time (k−1), an estimated value V_p(k) of the fill level in the fuel container (110) at the current point in time k can be determined in consideration of the fuel removal delta V(k) from the fuel container 110 within the time interval (k−1, k). The fuel removal can be determined by the fuel consumption of a drive engine, in particular an internal combustion engine, of the vehicle 100. The fuel removal can be determined in a precise manner on the basis of the sensor data of a consumption sensor 104 of the vehicle 100.

The determination of the fill level value solely on the basis of measured values with respect to the fuel removal can result in a cumulative error with time, for example, if the fuel removal is systematically measured excessively high or excessively low. Furthermore, the correct fill level value as a result of a fueling or defueling of the fuel container 110 cannot be determined using the above-mentioned recursive formula.

The device 101 can be configured to determine a (possible) minimum value V_min of the fill level of the fuel container 110 and a (possible) maximum value V_max of the fill level of the fuel container 110 on the basis of the measured value of the fill level sensor 113. In other words, a possible value interval or a possible value range for the fill level value of the fuel container 110 can be determined on the basis of the measured value of the fill level sensor 113. The minimum value V_min, the maximum value V_max, and/or the value interval [V_min, V_max] can be determined here in consideration of one or more systematic and/or longer-term error sources on the measured value of the fill level sensor 113. In particular, the minimum value V_min, the maximum value V_max, and/or the value interval [V_min, V_max] can be determined on the basis of the temperature data of the temperature sensor 112;
the pressure data of the pressure sensor 111; and/or
the sensor data of the inclination sensor 103.

Experimentally determined characteristic data can be taken into consideration in each case here, which enable the respective sensor data (or the respective combination of sensor data) to be converted starting from the measured value of the fill level sensor 113 into a minimum value or maximum value.

Figure 2B:
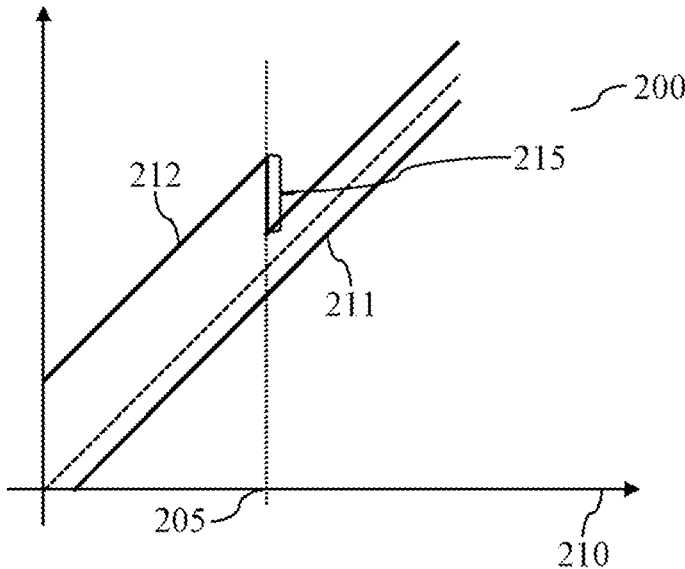
FIG. 2B shows exemplary characteristic data for determining a fill level value interval.

In the determination of the minimum value V_min, the maximum value V_max, and/or the value interval [V_min, V_max], the effect of a fuel enclosure in a subregion 202 of the fuel container can also be taken into consideration. In particular, as shown by way of example in FIG. 2B, characteristic data 200 can be taken into consideration, which indicate the minimum value 211 and/or the maximum value 212 as a function of the measured value 210 of the fill level sensor 113. The minimum value 211 can be less by a specific offset here than the measured value 210 of the fill level sensor 113 (wherein the measured value 210 is shown by the dashed diagonal line in FIG. 2B).

In a corresponding manner, the maximum value 212 can be above the measured value 210 of the fill level sensor 113 by a specific offset if the measured value 210 is greater than the fill level threshold value 205, from which an enclosure of fuel 115 can take place in an isolated subregion 202 of the fuel container 110. If the measured value 210 of the fill level sensor 113 is less than the fill level threshold value 205, an additional fuel offset 215 can then be taken into consideration, wherein the fuel offset 215 is dependent on the amount of fuel 115 which can be enclosed in the subregion 202 of the fuel container 110. The effect of a fuel enclosure in a fuel container 110 can thus be taken into consideration in an efficient and precise manner in the determination of the maximum value 212 and/or the value range.

The minimum value V_min, the maximum value V_max, and/or the value interval [V_min, V_max] for the fill level value can be determined for the current point in time k. It can then be checked whether the estimated value V_p(k) of the fill level (determined on the basis of the fuel removal) falls in the determined value range [V_min, V_max] and is thus consistent with the measured value of the fill level sensor 113. If this is the case, the estimated value V_p(k) of the fill level can thus be used as the fill level value V(k) for the current point in time k.

If the estimated value V_p(k) of the fill level does not fall in the determined value range [V_min, V_max] and is thus not consistent with the measured value of the fill level sensor 113, a correction of the estimated value V_p(k) of the fill level can thus be carried out to determine the fill level value V(k) for the current point in time k. In particular, the estimated value V_p(k) can be corrected (in particular raised) on the basis of the minimum value V_min if V_p(k)<V_min, for example, as V(k)=alpha*V_p(k)+(1−alpha)* V_min, wherein alpha is an update factor between 0 and 1. On the other hand, the estimated value V_p(k) can be corrected (in particular reduced) on the basis of the maximum value V_max if V_p(k)>V_max, for example, as V(k)=alpha*V_p(k)+(1−alpha)*V_max.

The fill level value can thus be determined in a particularly precise and robust manner in consideration of systematic and/or longer-term errors in the measurement of the fill level on the basis of a fill level sensor 113.

A method for calculating or estimating the fuel volume in a fuel tank or fuel container 110 is thus described. The problem is especially addressed here that there is a significant uncertainty in the determination of the fuel volume (i.e., the fill level value) by one or more sensors 113 in a tank 110 due to the geometry, the inclination, and/or the deformation of the tank 110 due to pressure and/or temperature. This uncertainty means that the measured values of the one or more fill level sensors 113 (for example, the one or more leverage generator sensors) of the tank 110 can be associated with different fuel volumes. A direct use of the one or more measured values for estimating the fuel volume would lead to an erroneous result in such cases or situations.

To attenuate uncertainties in the measurement, the measurement signal of a fill level sensor 113 can be filtered. In addition, this filtering can be assisted or supplemented with the aid of the consumed fuel amount deltaV(k). The consumption information with respect to the consumed fuel amount can be provided by the engine controller.

The filtering of the measurement signal is typically only expedient if the error in the measurement signal is not systematic or is not present over a longer period of time. For example, it can occur in a semi-saddle tank (as shown by way of example in conjunction with FIG. 2A) that for a longer period of time fuel 115 is retained in a part 202 of the tank 110 and is not detected by the fill level sensor 113, which results in an erroneous value of the fuel volume. In a corresponding manner, a deformation of the tank 110 due to overpressure or underpressure can result in systematic deviations in the determined value of the fuel volume. In these cases, the error is displayed after a certain time (depending on the embodiment of the filter) in the determined value of the fuel volume.

In the method described in this document, a minimum or maximum value for the fuel volume in the tank 110 is calculated (for a current point in time k). Depending on the tank 110, the following can be taken into consideration here:

what the pressure and/or temperature situation is in the tank 110 in order to estimate the deformation of the tank 110;

what the inclination/alignment of the vehicle 100 is; and/or which signal the one or more fill level sensors 113 provide.

For a measured value x 210 of the one or more fill level sensors 113, for a temperature value T of the temperature sensor 112, for a pressure value p of the pressure sensor 111, and/or for an inclination a_x, a_y (of the inclination sensor 103), a maximum volume V_max (x,T,p,a_x,a_y) and a minimum volume V_min (x,T,p,a_x,a_y) can be determined (each starting from the measured value x 210). The fill level or the fuel volume V(k) at the point in time k can be determined using these two values.

In a first step, an estimated value of the fill level or fuel volume can be determined as V_p(k)=V(k−1)−deltaV(k), wherein deltaV(k) is the fuel amount consumed by the engine. In a following step, a correction of the estimated value can possibly take place:

if V_min<V_p(k)<V_max, no correction takes place, i.e., V(k)=V_p(k);

if V_p(k)<V_min, a correction takes place, for example, of the type V(k)=alpha*V_p(k)+(1−alpha)*V_min; and/or if V_p(k)>V_max, a correction takes place, for example, of the type V(k)=alpha*V_p(k)+(1−alpha)*V_max.

The factor alpha can be defined (between 0 and 1) such that, for example, experimentally (on average) the smallest possible deviation results between the actually present fuel volume and the determined fuel volume V(k).

The method described in this document enables the measured values of the one or more fill level sensors 113 to be used to correct the estimated value (determined on the basis of the fuel consumption) in phases with low uncertainty (if V_max−V_min is relatively small). On the other hand, in phases in which there is a relatively large uncertainty (if V_max−V_min is relatively large), the fuel volume is determined solely on the basis of the fuel consumption (and thus is not influenced by systematic and/or long-term measurement inaccuracies).

The quality of the determined fuel volume is increased in particular in that during operation of a vehicle 100, phases having low uncertainty occur again and again, in particular upon the fueling of the fuel container 110, during which the fuel container 110 is depressurized and therefore has no uncertainty due to a deformation and/or during which the fuel container 110 has no inclination. In these phases, the fuel volume V(k) can be determined in a precise manner on the basis of the measured values of the one or more fill level sensors 113. On the other hand, the fuel volume V(k) is not corrupted by the uncertain measured values in phases with high uncertainty of the measured values of the one or more fill level sensors 113 (and is updated solely on the basis of the fuel consumption).

Figure 3:
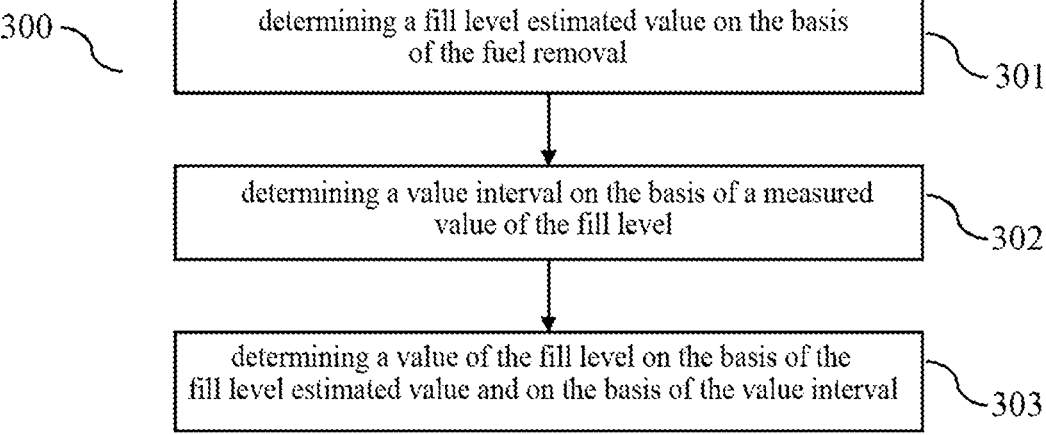
FIG. 3 shows a flow chart of an exemplary method for determining a fill level value of a fuel container.

FIG. 3 shows a flow chart of an exemplary method 300 (possibly computer implemented) for determining the value of the fuel volume and/or the fill level in a fuel container 110 for a current point in time (k). The method 300 can be carried out by an (evaluation) device 101 of a fuel container system. The fuel container system can be part of a vehicle 100.

The method 300 comprises determining 301, on the basis of a preceding value (V(k−1)) of the fuel volume for a preceding point in time (k−1) and on the basis of removal data (deltaV(k)) with respect to the fuel removal from the fuel container 110 (in the time interval between the preceding point in time and the current point in time), an estimated value (V_p(k)) of the fuel volume for the current point in time.

Furthermore, the method 300 comprises determining 302, on the basis of a measured value (x) of the fill level sensor 113 of the fuel container 110 for the current point in time (k), a minimum value (V_min) and/or maximum value (V_max) of the fuel volume for the current point in time (k). The measured value (x) of the fill level sensor 113 can thus be used to check which values of the fuel volume are possible at all. In particular, the measurement inaccuracy of the fill level sensor 113 can be determined for the current point in time.

The method 300 furthermore comprises determining 303 the value (V(k)) of the fuel volume for the current point in time on the basis of the estimated value of the fuel volume and on the basis of the minimum value and/or the maximum value of the fuel volume for the current point in time.

The present invention is not restricted to the exemplary embodiments shown. In particular, it is to be noted that the description and the figures are only to illustrate the principle of the proposed methods, devices, and systems by way of example.

LIST OF REFERENCE NUMERALS 100 vehicle
102 output unit
103 inclination sensor
104 consumption sensor
110 fuel container
111 pressure sensor
112 temperature sensor
113 fill level sensor
115 fuel
200 characteristic data
201, 202 subregions (fuel container)
205 fill level threshold value
211 minimum value
212 maximum value
215 fuel amount
300 method for determining the fuel volume in a fuel container
301-303 method steps

The invention claimed is:

1. A device for determining a value of a fuel volume in a fuel container for a current point in time, wherein the device is configured to:

determine an estimated value of the fuel volume for the current point in time on a basis of a preceding value of the fuel volume for a preceding point in time and on a basis of removal data with respect to a fuel removal from the fuel container;

determine a minimum value and/or a maximum value of the fuel volume for the current point in time on a basis of a measured value of a fill level sensor of the fuel container for the current point in time; and determine the value of the fuel volume for the current point in time on a basis of the estimated value of the fuel volume and on a basis of the minimum value and/or the maximum value of the fuel volume for the current point in time, wherein, in order to determine the value of the fuel volume for the current point in time, the device is configured to:

determine whether the estimated value of the fuel volume for the current point in time falls in a value interval for the fuel volume defined by the minimum value and the maximum value; and accept the estimated value of the fuel volume for the current point in time as the value of the fuel volume for the current point in time in response to determining that the estimated value of the fuel volume for the current point in time falls in the value interval for the fuel volume.

2. The device according to claim 1, wherein the device is configured to:

adapt or leave unchanged the estimated value of the fuel volume for the current point in time on the basis of the minimum value and/or the maximum value of the fuel volume for the current point in time, as a function of a deviation of the maximum value from the minimum value, in order to determine the value of the fuel volume for the current point in time.

3. The device according to claim 1, wherein the device is configured to:

determine that the estimated value of the fuel volume for the current point in time is less than the minimum value of the fuel volume for the current point in time; and responsively increase the estimated value of the fuel volume for the current point in time as a function of the minimum value of the fuel volume for the current point in time in order to determine the value of the fuel volume for the current point in time.

4. The device according to claim 1, wherein the device is configured to:

determine that the estimated value of the fuel volume for the current point in time is greater than the maximum value of the fuel volume for the current point in time; and responsively reduce the estimated value of the fuel volume for the current point in time as a function of the maximum value of the fuel volume for the current point in time in order to determine the value of the fuel volume for the current point in time.

5. The device according to claim 1, wherein the device is configured to:

determine the value V(k) of the fuel volume for the current point in time k according to $$V(k) = \text{alpha} * V\_p(k) + (1 - \text{alpha}) * V\_\text{min},$$

wherein V_p(k) is the estimated value of the fuel volume for the current point in time k, wherein V_min is the minimum value of the fuel volume for the current point in time k, and wherein alpha is an adjustment factor between 0 and 1; and/or determine the value V(k) of the fuel volume for the current point in time k according to $$V(k) = \text{alpha} * V\_p(k) + (1 - \text{alpha}) * V\_\text{max},$$

wherein V_max is a maximum value of the fuel volume for the current point in time k.

6. The device according to claim 1, wherein the device is configured to:

determine pressure data with respect to an internal pressure of the fuel container for the current point in time on a basis of a pressure sensor; and determine the minimum value and/or the maximum value of the fuel volume for the current point in time on a basis of the pressure data.

7. The device according to claim 1, wherein the device is configured to:

determine temperature data with respect to a temperature of the fuel container and/or with respect to a temperature of fuel in the fuel container for the current point in time on a basis of a temperature sensor; and determine the minimum value and/or the maximum value of the fuel volume for the current point in time on a basis of the temperature data.

8. The device according to claim 1, wherein the device is configured to:

determine inclination data with respect to an inclination of the fuel container for the current point in time on the basis of a sensor; and determine the minimum value and/or the maximum value of the fuel volume for the current point in time on the basis of the inclination data.

9. The device according to claim 1, wherein the fuel container is designed such that the fuel container includes at least one subregion, in which, depending on a fill level of the fuel container, fuel can be arranged without being detected by the fill level sensor; and wherein the device is configured to:

on a basis of the measured value of the fill level sensor of the fuel container for the current point in time, and on a basis of characteristic data with respect to the fuel container, estimate a fuel amount, which could be arranged in the subregion of the fuel container without being detected by the fill level sensor; and determine the maximum value of the fuel volume for the current point in time on the basis of the estimated fuel amount.

10. The device according to claim 9, wherein the characteristic data for different measured values of the fill level sensor each indicate an estimated fuel amount which, at the fill level of the fuel container indicated by the respective measured value, could be arranged in the subregion of the fuel container without being detected by the fill level sensor; and/or wherein the characteristic data were experimentally determined beforehand.

11. The device according to claim 1, wherein the fuel is removed from the fuel container to operate an internal combustion engine; and the device is configured to determine the removal data with respect to the fuel removal on a basis of a consumption amount of fuel which was consumed between the preceding point in time and the current point in time by the internal combustion engine.

12. The device according to claim 1, wherein the device is configured to, for a sequence of successive points in time, iteratively, in each case:

determine an estimated value of the fuel volume for the respective point in time on a basis of the respective preceding value of the fuel volume for the respective preceding point in time and on a basis of respective current removal data with respect to the fuel removal from the fuel container;

determine a minimum value and/or a maximum value of the fuel volume for the respective point in time on a basis of a measured value of the fill level sensor of the fuel container for the respective point in time; and determine the value of the fuel volume for the respective point in time on the basis of the estimated value of the fuel volume and on the basis of the minimum value and/or the maximum value of the fuel volume for the respective point in time.

13. A method for determining a value of a fuel volume in a fuel container for a current point in time; the method comprising:

determining an estimated value of the fuel volume for the current point in time on a basis of a preceding value of the fuel volume for a preceding point in time and on a basis of removal data with respect to a fuel removal from the fuel container;

determining a minimum value and/or a maximum value of the fuel volume for the current point in time on a basis of a measured value of a fill level sensor of the fuel container for the current point in time; and determining the value of the fuel volume for the current point in time on a basis of the estimated value of the fuel volume and on a basis of the minimum value and/or the maximum value of the fuel volume for the current point in time, wherein determining the value of the fuel volume for the current point in time comprises:

determining whether the estimated value of the fuel volume for the current point in time falls in a value interval for the fuel volume defined by the minimum value and the maximum value; and accepting the estimated value of the fuel volume for the current point in time as the value of the fuel volume for the current point in time in response to determining that the estimated value of the fuel volume for the current point in time falls in the value interval for the fuel volume.

14. The method according to claim 13, comprising:

adapting or leaving unchanged the estimated value of the fuel volume for the current point in time on the basis of the minimum value and/or the maximum value of the fuel volume for the current point in time, as a function of a deviation of the maximum value from the minimum value, in order to determine the value of the fuel volume for the current point in time.

15. The method according to claim 13, comprising:

determining that the estimated value of the fuel volume for the current point in time is less than the minimum value of the fuel volume for the current point in time; and responsively increasing the estimated value of the fuel volume for the current point in time as a function of the minimum value of the fuel volume for the current point in time in order to determine the value of the fuel volume for the current point in time.

16. The method according to claim 13, comprising:

determining that the estimated value of the fuel volume for the current point in time is greater than the maximum value of the fuel volume for the current point in time; and responsively reducing the estimated value of the fuel volume for the current point in time as a function of the maximum value of the fuel volume for the current point in time in order to determine the value of the fuel volume for the current point in time.

17. The method according to claim 13, comprising:

determining the value V(k) of the fuel volume for the current point in time k according to V(k)=alpha*V_p (k)+(1−alpha)*V_min, wherein V_p(k) is the estimated value of the fuel volume for the current point in time k, wherein V_min is the minimum value of the fuel volume for the current point in time k, and wherein alpha is an adjustment factor between 0 and 1;

and/or determining the value V(k) of the fuel volume for the current point in time k according to $$V(k) = \mathrm{alpha} * \mathrm{V\_p}(k) + (1 - \mathrm{alpha}) * \mathrm{V\_max},$$

wherein V_max is a maximum value of the fuel volume for the current point in time k.

18. The method according to claim 13, comprising:

determining pressure data with respect to an internal pressure of the fuel container for the current point in time on a basis of a pressure sensor; and determining the minimum value and/or the maximum value of the fuel volume for the current point in time on a basis of the pressure data.

* * * * *